United States Patent [19]

Kimura et al.

[11] Patent Number: 5,196,472
[45] Date of Patent: Mar. 23, 1993

[54] BIAXIALLY ORIENTED POLYESTER FILM

[75] Inventors: Manabu Kimura; Tetsuo Ichihashi; Nobuo Minobe, all of Matsuyama, Japan

[73] Assignee: Teijin Limited, Osaka, Japan

[21] Appl. No.: 798,103

[22] Filed: Nov. 26, 1991

[30] Foreign Application Priority Data

Nov. 26, 1990 [JP] Japan ............................ 2-317946

[51] Int. Cl.$^5$ ............................................. C08J 5/18
[52] U.S. Cl. ................................. 524/425; 428/143; 428/480
[58] Field of Search ........................................ 524/425

[56] References Cited

U.S. PATENT DOCUMENTS

| | | | |
|---|---|---|---|
| 3,884,870 | 5/1975 | Dodson et al. | 524/425 |
| 4,539,389 | 9/1985 | Kiriyama et al. | 523/181 |
| 4,619,869 | 10/1986 | Kiriyama et al. | 428/694 |
| 4,693,932 | 9/1987 | Kuze et al. | 524/425 |
| 4,818,581 | 4/1989 | Katoh et al. | 428/143 |
| 4,965,307 | 10/1990 | Okabe et al. | 524/425 |
| 5,023,291 | 6/1991 | Sakamoto | 524/430 |
| 5,061,571 | 10/1991 | Sakamoto | 428/480 |

FOREIGN PATENT DOCUMENTS

| | | |
|---|---|---|
| 0229670 | 7/1987 | European Pat. Off. . |
| 0432724 | 6/1991 | European Pat. Off. . |
| 0459399 | 12/1991 | European Pat. Off. . |

*Primary Examiner*—Paul R. Michl
*Assistant Examiner*—Olga Hsinovsky
*Attorney, Agent, or Firm*—Sherman and Shalloway

[57] ABSTRACT

A biaxially oriented polyester film formed from an aromatic polyester composition containing:

(A) 100 parts by weight of an aromatic polyester, and
(B) 0.005 to 5 parts by weight of calcium carbonate particles defined by:
 (a) a length/width ratio (2a/2b) in the range of from 1.25 to 3,
 (b) an average particle diameter ($\overline{D}$), as a diameter of a circle converted from an area, in the range of from 0.05 to 5 μm, and
 (c) an ellipse coefficient, represented by the following equation (1), in the range of from 0.7 to 1.2, $$R = \frac{S_1}{S_2} \tag{1}$$

wherein R is an ellipse coefficient, $S_1$ is an observed area of a projected plane of a particle, and $S_2$ is an elliptical area determined on the basis of observed values of the length (2a) and width (2b);

and a magnetic recording medium formed of the above biaxially oriented polyester film and a magnetic layer formed thereon.

13 Claims, 2 Drawing Sheets

BIAXIALLY ORIENTED POLYESTER FILM

DETAILED DESCRIPTION OF THE INVENTION

Figure 1:
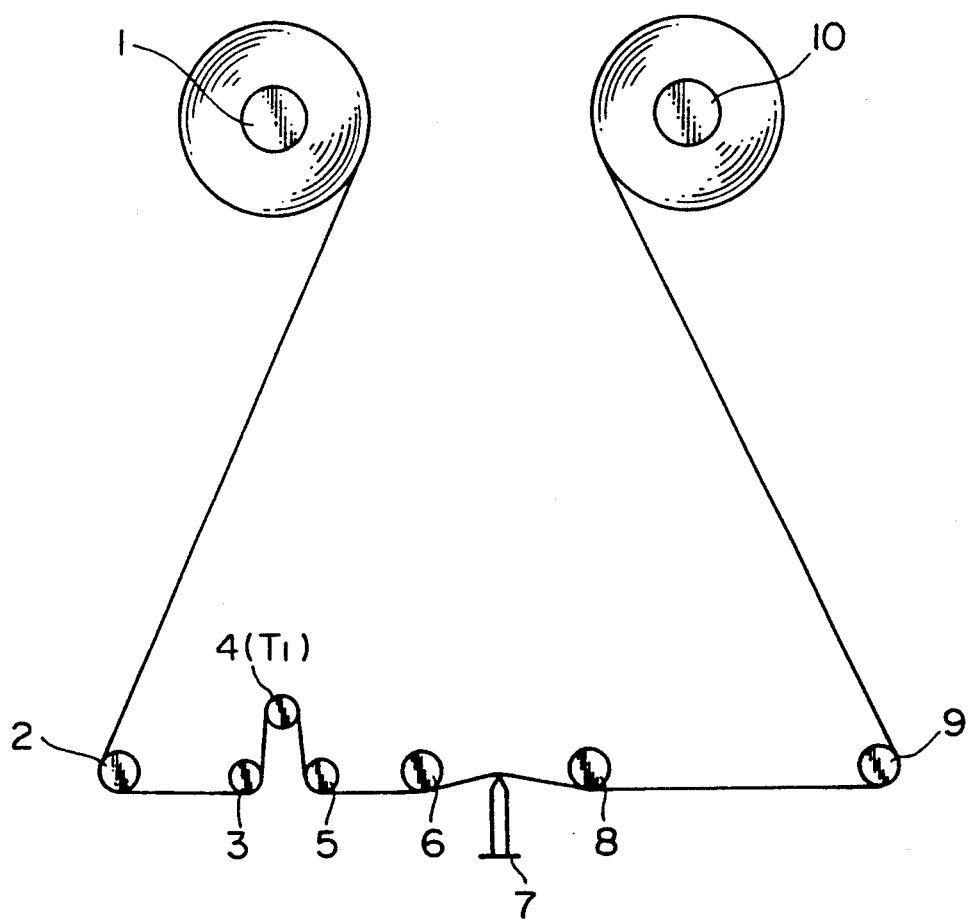

The present invention relates to a biaxially oriented polyester film. More specifically, it relates to a biaxially oriented polyester film which contains calcium carbonate particles having a specific form and a specific particle diameter and which is excellent in transparency, sliding properties and abrasion resistance.

In general, a polyester such as polyethylene terephthalate or polyethylene naphthalate in particular is widely used as a film or fiber utilizing its dynamic properties and chemical properties. When, however, a film or fiber fully utilizing its transparency and brightness is produced, there are often caused failures in forming and processing in its forming and processing steps. Such failures are mainly caused by a high coefficient of friction of the film or fiber.

As a method of improving the surface properties of a polyester by decreasing its coefficient of friction, the following two methods are conventionally known in which fine particles are incorporated into a polyester.

(1) A method in which part or all of a catalyst, etc., used during the polyester synthesis are precipitated in the synthesis reaction step (internal particle-precipitation method).

(2) A method in which fine particles of calcium carbonate or silicon oxide are added during or after the polymerization (external particle-addition method).

The above (1) internal particle-precipitation method has an advantage that fine particles used have affinity to a polyester to some extend since the fine particles are metal salts, etc., of polyester components such as dicarboxylic acid component. Since, however, the fine particles are formed during the reaction, it is difficult to control the amount and diameter of the fine particles and prevent the formation of coarse particles.

On the other hand, the above external particle-addition method has an advantage that a polyester having excellent slide easiness can be obtained when fine particles are added after the diameter and amount of fine particles to be added are suitably selected and coarse particles are removed therefrom by classification. However, the defect with this method is that since the affinity between the inorganic fine particles and a polyester which is an organic component is generally insufficient, a peeled state is liable to occur in an interface between a fine particle and a polyester during the orientation to cause a void. Therefore, the external particle-addition method still has problems to be overcome in respect of transparency, abrasion resistance and wear resistance of a polyester.

Japanese Patent Publication No. 34088/1982 discloses an oriented polyester film containing:

(a) 0.03 to 1% by weight of inert substance particles having an average particle diameter of not more than 0.8 μm and a volume form coefficient (f), defined by the following equation, of less than 0.08, $$f = V/D^3$$

in which D is a maximum diameter (μm) of a projected area of each inert substance particle and V is a particle volume (μm³) of each inert substance particle, and (b) 0.002 to 0.1% by weight of an inert substance having a particle diameter which is greater than the particle diameter of the above inert substance particles and not more than 1.8 μm, and a volume form coefficient (f) of 0.08 to π/6.

The above oriented polyester film is characterized in excellent abrasion and wear resistance and fatigue resistance produced due to the use of two inert substances of which the particle diameters and volume form coefficients are mutually different.

Japanese Laid-Open Patent Publication No. 182,730/1990 discloses an biaxially oriented polyester film containing calcium carbonate-containing plate-like particles having an average particle diameter of not more than 1 μm and an average plate-form ratio (plate diameter/plate thickness ratio) of not less than 2.5 in an amount which satisfies the following formula, $$0.0005 \leq W \times D \leq 0.30$$

in which W is a content (% by weight) of the calcium carbonate-containing plate-form particles and D is an average particle diameter (μm) of the calcium carbonate-containing plate-form particles.

The above film is characterized in excellent abrasion and wear resistance and excellent slide easiness produced due to the use of the plate-like particles.

Japanese Laid-Open Patent Publication No. 185,033/1991, which was laid open on Aug. 13, 1991 falling after the priority data of the present application, discloses a biaxially oriented polyester film containing 0.01 to 4% by weight of inorganic particles having a volume form coefficient (f) of 0.02 to 0.20, an average particle diameter of 0.05 to 3 μm and a weight average particle diameter (Dw)/a number average particle diameter (Dn) ratio (Dw/Dn) of not more than 1.0.

The above Laid-Open Patent Publication discloses inorganic particles of spindle-shaped, light calcium carbonate, flat barium ferrite and rod-like silicon nitrate. It is also described in the above publication that the above film has a uniform surface and is excellent in running properties and abrasion and wear resistance.

It is an object of the present invention to provide a biaxially oriented polyester film.

It is another object of the present invention to provide ea biaxially oriented polyester film which is excellent in transparency, sliding properties and abrasion resistance.

It is further another object of the present invention to provide a biaxially oriented polyester film containing calcium carbonate particles having a specific form and a specific particle diameter, which is biaxially oriented but is almost free from voids and therefore excellent in transparency, and which is also excellent in sliding properties and abrasion resistance.

Further, it is another object of the present invention to provide ea magnetic recording medium in which the above biaxially oriented polyester film of the present invention is used as a base film.

The above and other objects and advantages of the present invention will be apparent from the following description.

According to the present invention, the above objects and advantages of the present invention are achieved by a biaxially oriented polyester film formed from an aromatic polyester composition containing:

(A) 100 parts by weight of an aromatic polyester, and
(B) 0.005 to 5 parts by weight of calcium carbonate particles defined by (a) a length/width ratio (2a/2b) in the range of from 1.25 to 3,
(b) an average particle diameter ($\overline{D}$), as a diameter of a circle converted from an area, in the range of from 0.05 to 5 μm, and
(c) an ellipse coefficient, represented by the following equation (1), in the range of from 0.7 to 1.2, $$R = \frac{S_1}{S_2} \quad (1)$$

wherein R is an ellipse coefficient, $S_1$ is an observed area of a projected plane of a particle, and $S_2$ is an area of ellipse determined on the basis of observed values of the length (2a) and width (2b).

As an aromatic polyester as a component for the biaxially oriented polyester film of the present invention, preferred is a polyester which comprises an aromatic dicarboxylic acid as a main carboxylic acid component and an aliphatic diol having 2 to 10 carbon atoms as a main glycol component. A polyester which is substantially linear and has the capability of forming a film while it is melted is advantageously used as such polyester.

Examples of the aromatic dicarboxylic acid are terephthalic acid, naphthalenedicarboxylic acid, isophthalic acid, diphenylethanedicarboxylic acid, diphenyldicarboxylic acid, dipheyletherdicarboxylic acid, diphenylsulfonedicarboxylic acid, diphenylketonedicarboxylic acid, etc.

Examples of the aliphatic glycol are polymethylene glycols having 2 to 10 carbon atoms such as ethylene glycol, trimethylene glycol, tetramethylene glycol, pentamethylene glycol and decamethylene glycol and alicyclic diols such as cyclohexanedimethanol.

As an aromatic polyester, preferred is a polyester containing alkylene terephthalate or alkylene naphthalate as a main component.

In such an aromatic polyester, not more than 20 mol % of the entire amount of the dicarboxylic acid component may be selected from the above-described aromatic dicarboxylic acids other than terephthalic acid and 2,6-napthalenedicarboxylic acid. And, it may also be selected from aliphatic dicarboxylic acids such as adipic acid and sebacic acid; and alicyclic dicarboxylic acids such as cyclohexane-1,4-dicarboxylic acid.

Further, not more than 20 mol % of the entire amount of the glycol component may be selected from the above-described glycols other than ethylene glycol and 1,4-butanediol, and it may be also selected from aromatic diols such as hydroquinone, resorcin and 2,2-bis(4-hydroxyphenyl)propane; aliphatic diols having an aromatic ring such as 1,4-dihydroxymethylbenzene; and polyalkylene glycols (polyoxyalkylene glycols) such as polyethylene glycol, polypropylene glycol and polytetramethylene glycol.

The aromatic polyester of the present invention includes a polyester copolymerized with or bonded to not more than 20 mol % of a component derived, for example, from an oxycarboxylic acid selected from aromatic oxyacids such as hydroxybenzoic acid and aliphatic oxyacids such as ω-hydroxycaproic acid, based on the total amount of dicarboxylic acid component and the oxycarboxylic acid component.

Further, the aromatic polyester of the present invention includes a polyester obtained by copolymerization of a polycarboxylic acid or polyhydroxy compound having at least three functional groups such as trimellitic acid and pentaerythritol in such an amount that the resultant polyester is substantially linear, e.g., not more than 2 mol % based on the total acid component amount.

As an aromatic polyester used in the present invention, preferred is a polyester which contains, as a main recurring unit, a unit selected from the group consisting of ethylene terephthalate, ethylene-2,6-naphthalate, butylene terephthalate and butylene-2,6-naphthalate. Above all, a polyester containing, as a recurring unit, polyethylene terephthalate, polyethylene-2,6-naphthalate, polybutylene terephthalate or polybutylene-2,6-napthalate is naturally particularly preferred, and also particularly preferred is a copolymer in which not less than 80 mol % of the total dicarboxylic acid component is derived from terephthalic acid or 2,6-napthalenedicarboxylic acid and not less than 80 mol % of the total glycol component is derived from ethylene glycol or 1,4-butanediol.

The above aromatic polyester is known per se, and can be produced by a known method.

The aromatic polyester preferably has an inherent viscosity, measured in o-chlorophenol at 35° C., of about 0.4 to about 0.9.

The biaxially oriented polyester film of the present invention is a product which contains calcium carbonate particles having a specific form and diameter in the above aromatic polyester.

The calcium carbonate particles generally have a form of an ellipsoid or revolution.

The form of the above calcium carbonate particles is defined by the length/width ratio in the range of 1.25 to 3 and the ellipse coefficient, defined in the above equation (1), in the range of 0.7 to 1.2 as is described above.

In the particle form, the maximum diameter is taken as a length (2a), and the straight line going through the center of the particle [a distance of ½ of the maximum diameter (or length) from its end] and at right angles with the length is taken as a width (2b). The length/width ratio is a value represented by 2a/2b.

When the length/width ratio is less than 1.25, the particles do not show any stress relaxation in the film stretching direction, and the affinity between each particle and the polyester is undesirably defective. When the length/width ratio exceeds 3, the resultant film shows insufficient abrasion resistance.

The length/width ratio is preferably 1.3 to 2.5, and more preferably 1.4 to 2.5.

The ellipse coefficient (R) is a ratio between an observed area ($S_1$) of a projected plane of a particle and an area of ellipse ($\pi a b$, $S_2$) determined on the basis of observed values of the length (2a) and width (2b) as defined in the above equation (1).

The above calcium carbonate particles used in the present invention has an ellipse coefficient (R) in the range of 0.7 to 1.2, which means that the calcium carbonate particles generally have a form of an ellipsoid of revolution, as is clear from the above definitions.

The ellipse coefficient (R) is preferably 0.7 to 1.14, and more preferably 0.75 to 1.05.

Further, the above calcium carbonate particles used in the present invention have an average particle diameter ($\overline{D}$), as a diameter of a circle converted from an area, in the range of 0.05 to 5 μm.

The average particle diameter as a diameter of a circle converted from an area is a value obtained by measuring projected areas of 100 particles, converting the areas into circles and calculating the average of the diameters of the circles.

When the average particle diameter as a diameter of a circle converted from an area exceeds 5μ, the degree of film surface roughness is increased more than required, which undesirably causes a decrease in transparency, or a decrease in electromagnetic modulation characteristics or an increase in dropout after the formation of a magnetic tape. On the other hand, calcium carbonate particles having an average particle diameter, as a diameter of a circle converted from an area, of less than 0.05 μm undesirably results in being poor in film handling properties and magnetic tape running properties.

The average particle diameter as a diameter of a circle converted from an area is preferably 0.05 to 3, and more preferably 0.1 to 2.

The above calcium carbonate particles used in the present invention preferably have a sharp particle size distribution.

Specifically, the calcium carbonate particles preferably have a relative standard deviation, represented by the following equation, of not more than 0.5, and more preferably not more than 0.3.

$$\text{Relative standard deviation} = \frac{\sqrt{\sum_{i=1}^{n}(D_1 - \overline{D})^2/n}}{\overline{D}}$$

in which $D_i$ is a particle diameter, as a diameter of a circle converted from an area, of each particle, $\overline{D}$ is an average particle diameter as a diameter of a circle converted from an area, and n is a number (100 pieces) of particles.

The above calcium carbonate particles have a crystal form of, e.g., calcite, aragonite, vaterite, etc. Of these, vaterite calcium carbonate is preferred.

The above calcium carbonate particles can be produced, for example, by a carbon dioxide gas blowing method, a salt double decomposition method, or a method in which calcium chloride and sodium hydrogencarbonate are reacted in the presence of ammonia. For example, the above calcium carbonate particles can be obtained by blowing carbon dioxide gas into a calcium hydroxide slurry, adding an aqueous polysaccharide or a sulfate to the slurry when the carbonation ratio reaches 60 to 70%, and further carrying out the carbonation up to a carbonation ratio of about 100%.

The biaxially oriented polyester film of the present invention formed from an aromatic polyester composition containing 0.005 to 5 parts by weight, per 100 parts by weight of the above aromatic polyester, of the calcium carbonate particles.

When the content of the calcium carbonate particles is less than 0.005 part by weight, the resultant magnetic tape undesirably shows poor running properties. When the above content exceeds 5 parts by weight, particles have coarse projections due to their agglomeration, and the resultant film undesirably shows a decrease in transparency, or the resultant magnetic tape undesirably shows a decrease in electromagnetic modulation characteristics.

The content of the calcium carbonate particles is preferably 0.01 to 3 parts by weight.

The above aromatic polyester composition can be produced by adding the calcium carbonate particles to the aromatic polyester before, during or after the polycondensation reaction of the aromatic polyester. In particular, it is preferred to add the calcium carbonate particles before the polycondensation reaction or at an initial stage of the polycondensation reaction. It is particularly preferred to add the calcium carbonate particles in the form of a glycol slurry before the ester interchange or the esterification reaction finishes.

The above calcium carbonate particles may be surface-modified with various surface-treating agents before use. These surface-treating agents are generally used to improve the affinity of the particles to the ethylene glycol or polyester, and the amount thereof for use is not more than 5% by weight based on the particles. The surface-treating agent is selected from a silane-coupling agent, a titanium-coupling agent, polyacrylic acid, etc.

The above aromatic polyester composition can be formed into a film as follows. That is, a film is formed directly from the above aromatic polyester composition or after diluting it with other polyester which does not contain the calcium carbonate particles in a predetermined amount. The other polyester is selected, for example, from polyesters produced by a conventional precipitation method or addition method, or polyesters containing no particles. It is required in any case that the finally molded film should contain a predetermined amount of the calcium carbonate particles.

The biaxially oriented polyester film of the present invention can be produced from the above aromatic polyester composition by a known method.

For example, the above film may be formed by a method in which the above composition is melt-extruded in the form of a sheet at a temperature between 280° C. and 300° C., the sheet is set by cooling it to form an amorphous sheet, and then the amorphous sheet is biaxially stretched consecutively in the longitudinal and lateral directions or in the longitudinal, lateral and longitudinal directions, or by a method in which the above amorphous sheet is biaxially stretched concurrently in the longitudinal and lateral directions.

When the calcium carbonate particles satisfy the above conditions for their form and average particle diameter, the calcium carbonate particles show stress relaxation in the polyester stretching direction due to tension exerted on the particles during the film formation. Therefore, the calcium carbonate particles show high affinity to the polyester, and there can be formed a biaxially oriented film which is excellent in transparency, sliding properties and abrasion resistance. Such a film can be used in a variety of fields.

For example, the biaxially oriented polyester film of the present invention can be advantageously used as a magnetic recording medium after a magnetic layer is formed thereon.

The present invention will be detailed hereinafter by reference to Examples. However, the present invention shall not be limited to these Examples. The measurements of the physical properties and characteristics, and the definitions described in Examples are as follows. In addition, "part" in Examples stands for "part by weight".

(1) ELLIPSE COEFFICIENT, LENGTH/WIDTH RATIO AND AVERAGE PARTICLE DIAMETER AS A DIAMETER OF A CIRCLE CONVERTED FROM AN AREA

The ellipse coefficient, the length/width ratio and the average particle diameter as a diameter of a circle converted from an area were measured in the following manners.

1) Case of Powdery Particles

Particles were placed so scatteringly on a stage of an electron microscope that the overlapping of the particles could be avoided as much as possible. A thin gold-deposited film having a thickness of 20 to 30 nm was formed on each particle surface with a gold sputtering apparatus. While the particles were observed with the scanning electron microscope at 10,000 to 30,000 magnifications, 100 particles were measured for a length, width and diameter, as a diameter of a circle converted from an area, with an area measuring apparatus (LUZEX 5000, supplied by Nihon Regulator Co., Ltd). When the sample stage was tilted at 30 to 60 degrees, the particles could be stereoscopically observed, and the length, width and form thereof could be easily determined.

2) Case of Particles in a Film

A small piece of a sample film was fixed on a sample stage of a scanning electron microscope, and an ion-etching treatment was effected on the sample surface with a sputtering apparatus (Ion Coater apparatus, Model No. 1B-2, supplied by Eiko Engineering Co., Ltd) under the following conditions. The sample was placed within a cylinder-jar, and the degree of vacuum was increased to about $5 \times 10^{-2}$ Torr. The ion-etching was carried out at a voltage of 900 V at a current of 5 mA for about 5 minutes. Further, a gold-sputtering treatment was effected on the film surface with the above apparatus, and while the film surface was observed with a scanning electron microscope at 10,000 to 30,000 magnifications, the length, width and diameter as a diameter of a circle converted from an area were determined in the same manner as in the above 1). The particle form could be also determined by observing particles in the cross section of the film in the same manner as in the above 1).

(2) AFFINITY

The vicinity of the particles in the film (surface) was subjected to an ion-etching treatment in the same manner as in the above (1)-2) to expose it. And 50 fine particulates were measured for a length, and voids were measured for a length. Then, the number average value of the void ratio defined by the following equation was determined.

$$\text{Void ratio} = \frac{\text{length of void}}{\text{length of fine particulates}}$$

The affinity was evaluated on the following ratings based on the above number average value.

1st grade: $1 \leq$ void ratio $< 1.5$ (This means that no void exists or voids of very small size exist.)
2nd grade: $1.5 \leq$ void ratio $< 2.0$
3rd grade: $2.0 \leq$ void ratio $< 3.0$
4th grade: $3.0 \leq$ void ratio $< 4.0$ (3) ABRASION-1

A film was measured for an abrasion-1 as follows with an apparatus shown in FIG. 1, in which numeral 1 indicates an unwinding reel, numeral 2 indicates a tension controller, 3, 5, 6 and 8 indicate free rollers, 4 indicates a tension detector, 7 indicates a blade (blade for tester for industrial razors, supplied by GKI in the United States of America), numeral 9 indicates a guide roller, and 10 indicates a take-up reel.

A tape prepared by slitting a film to a width of ½ inch was allowed to run 100 m under a tension of 50 g at a running rate of 100 m/minute while the tape was adjusted to touch a blade edge at an angle of 6 degrees. The abrasion-1 was evaluated on the basis of an amount of a powder adhering to the blade edge (at the side of the roller 6).

The amount of the powder adhering to the blade was observed by measuring a width of the powder adhering to the blade under a microscope, and taken as an abrasion amount ($\mu$m). The results of the abrasion-1 correspond to a phenomenon in a film processing step.
{Evaluation at four ratings}
1st grade: abrasion amount = less than 5 $\mu$m.
2nd grade: abrasion amount = 5 to 10 $\mu$m.
3rd grade: abrasion amount = 10 to 15 $\mu$m.
4th grade: abrasion amount = more than 15 $\mu$m.

(4) ABRASION-2

The abrasion of a running surface of a film was evaluated with a five-roll minisuper calender. The treatment with the calender was carried out with the five-roll calender consisting of nylon rolls and steel rolls at a treatment temperature of 80° C., at a film contact pressure of 200 kg/cm, and at a film speed of 70 m/minute. The abrasion of the running film was evaluated on the basis of the degree of dirt adhering to the top roll when the tape had been allowed to run in the total distance of 5,000 m.
{Evaluation at four ratings}
1st grade: no dirt on nylon roll
2nd grade: almost no dirt on nylon roll
3rd grade: dirt on nylon roll
4th grade: heavy dirt on nylon roll (5) HAZE A film haze was determined according to JIS K674 with an integrating sphere method HTR meter supplied by Nippon Seimitsu Kogaku.

(6) COEFFICIENT OF FRICTION

Figure 2:
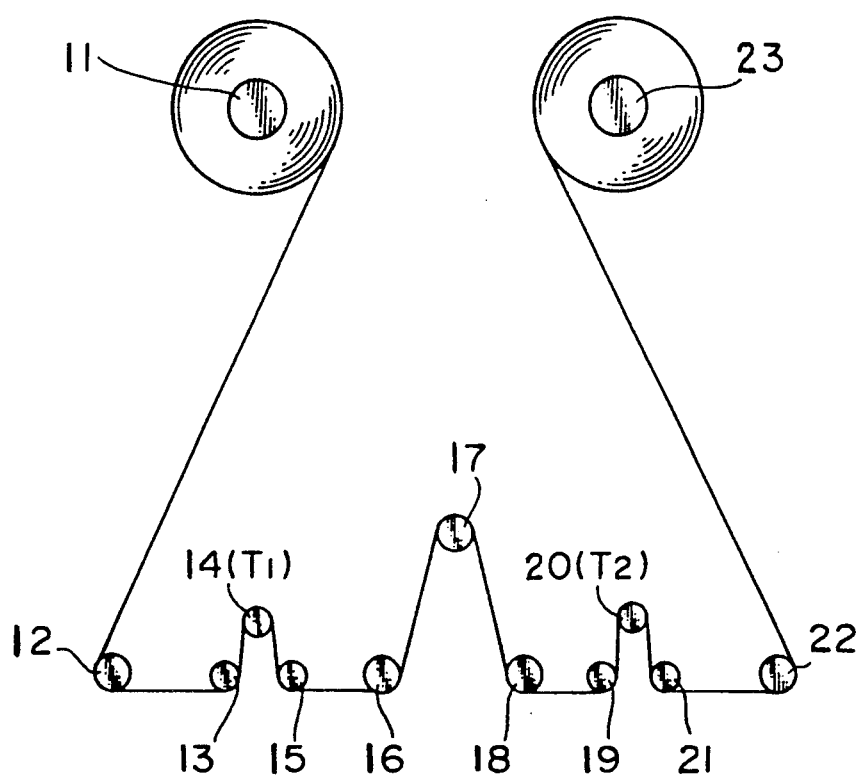

Measured in the following manner with an apparatus shown in FIG. 2. In FIG. 2, numeral 11 indicates an unwinding reel, numeral 12 indicates a tension controller, numerals 13, 15, 16, 18, 19 and 21 indicate free rollers, 14 indicates a tension detector (inlet), numeral 17 indicates a fixing rod made of stainless steel SUS304 (outer diameter 5 mm$\phi$), numeral 20 indicates a tension detector (outlet), numeral 22 is a guide roller, and numeral 23 indicates a take-up reel.

Under an environment having a temperature of 20° C. and a humidity of 60%, a film having a width of ½ inch was moved (frictionally) at a rate of 200 cm/minute under a contact to the fixing rod 17 (surface roughness 0.3 $\mu$m) at an angle $\theta = (152/180) \pi$ radian (152 degrees). When an inlet tension $T_1$ was adjusted to 35 g with the tension controller 12, and after the film ran 90 m, an outlet tension ($T_2$: g) was detected with the outlet tension detector 20, and the running friction coefficient ($\mu k$) was calculated on the basis of the following equation.

$$\mu k = (2.303/\theta) \log (T_2/T_1) = 0.8681 \log (T_2/35)$$

EXAMPLES 1-5

In each of examples, 100 parts of dimethyl terephthalate and 70 parts of ethylene glycol (to be abbreviated as EG hereinafter) were subjected to an ester interchange reaction in the presence of 0.035 part of manganese acetate tetrahydrate as a catalyst in a customary manner, and then, 0.03 part of trimethyl phosphate was added. Further, 1 part of an EG slurry (calcium carbonate concentration 0.2% by weight based on the polymer) consisting of 10 parts of calcium carbonate particles having a length/width ratio of 1.6 to 2.2, an ellipse coefficient of 0.88 to 0.95, a relative standard deviation of 0.2 to 0.7 and an average particle diameter, as a diameter of a circle converted from an area, of 0.15 to 1.39 $\mu$m and 90 parts of EG was added with stirring.

Thereafter, 0.03 part of antimony trioxide was added, and the resultant mixture was subjected to a polycondensation reaction at a high temperature under vacuum according to a customary manner to give a polyethylene terephthalate having an intrinsic viscosity (in o-chlorophenol at 35° C.) of 0.60 dl/g.

The above-obtained polyethylene terephthalate was dried at 180° C., and melt-extruded with an extruder to form a sheet. Then, the sheet was biaxially stretched at 90° C. at a length stretching ratio of 3.5 times and a width stretching ratio of 4.0 times, and then thermally set to form a film having a thickness of 15 $\mu$m.

Table 1 shows the properties of the above-obtained films. The films obtained had high transparency, and the affinity of the calcium carbonate particles to the polymer in each film was high. Further, these films showed a remarkable improvement in the abrasion-1 and abrasion-2. These films also showed a low coefficient of friction or had excellent sliding properties.

COMPARATIVE EXAMPLES 1-3

The same procedures as in Examples 1 to 5 were repeated except that the calcium carbonate particles were replaced with spherical silica having a sharp particle size distribution (length/width ratio=1.1 to 1.2, relative standard deviation=0.2, average particle diameter as a diameter of a circle converted from an area=0.43 to 1.52 $\mu$m) thereby to obtain polyesters and further obtain films.

Table 1 shows the properties of these films. Having had a low coefficient of friction, these films had low transparency, and was poor in abrasion and wearing resistance.

COMPARATIVE EXAMPLES 4-6

The same procedures as in Example 1 to 5 were repeated except that the calcium carbonate particles were replaced with massive calcium carbonate (relative standard deviation=1 or larger; average particle diameter as a diameter of a circle converted from an area=0.56 to 1.28 $\mu$m; a length/width ratio and an ellipse coefficient were not definable since the calcium carbonate was massive.) thereby to obtain polyesters and further obtain films.

Table 1 shows the properties of these films. The films showed low transparency, and the affinity of the calcium carbonate particles in the film to the polymer was also low. Although some good effect on the abrasion-1 was observed, these films were inferior in the abrasion-2, and their coefficients of friction were also high.

COMPARATIVE EXAMPLE 7

The same procedures as in Examples 1 to 5 were repeated except that the calcium carbonate particles were replaced with rod-like calcium carbonate (length/width ratio=10 or greater, relative standard deviation=1 or greater, average particle diameter as a diameter or a circle converted from an area=0.88 $\mu$m) thereby to obtain a polyester and further obtain a film.

Table 1 shows the properties of the above film. Although an effect on abrasion resistance was observed, the transparency of the film was low, and the affinity of the calcium carbonate particles in the film to the polymer was low. The film showed a high coefficient of friction.

TABLE 1

| | Particles | | | | | | | | | |
|---|---|---|---|---|---|---|---|---|---|---|
| | Kinds | Ellipse coefficient R | Length/width ratio 2a/2b | Average diameter ($\mu$m) | Relative standard deviation | Haze (%) | Affinity (grade) | Abrasion −1 (grade) | Abrasion −2 (grade) | Coefficient of friction ($\mu$k) |
| Example 1 | Elliptical calcium carbonate | 0.90 | 1.6 | 0.15 | 0.4 | 0.09 | 1 | 1 | 1 | 0.29 |
| Example 2 | Elliptical calcium carbonate | 0.88 | 1.7 | 0.24 | 0.3 | 0.10 | 1 | 1 | 1 | 0.29 |
| Example 3 | Elliptical calcium carbonate | 0.88 | 1.9 | 0.37 | 0.2 | 0.12 | 2 | 1 | 1 | 0.25 |
| Example 4 | Elliptical calcium carbonate | 0.95 | 1.7 | 0.72 | 0.5 | 0.15 | 2 | 2 | 2 | 0.22 |
| Example 5 | Elliptical calcium carbonate | 0.92 | 2.2 | 1.39 | 0.7 | 0.37 | 2 | 2 | 2 | 0.13 |
| Comparative Example 1 | Spherical silica | 0.96 | 1.1 | 0.43 | 0.2 | 0.69 | 2 | 3 | 2 | 0.21 |
| Comparative Example 2 | Spherical silica | 0.98 | 1.1 | 0.73 | 0.2 | 0.85 | 3 | 4 | 3 | 0.19 |
| Comparative Example 3 | Spherical silica | 0.96 | 1.2 | 1.52 | 0.2 | 1.03 | 3 | 4 | 4 | 0.14 |
| Comparative Example 4 | Massive calcium carbonate | — | — | 0.56 | 0.8 | 0.42 | 2 | 2 | 3 | 0.38 |
| Comparative Example 5 | Massive calcium carbonate | — | — | 0.75 | 1.1 | 0.58 | 3 | 3 | 4 | 0.33 |
| Comparative Example 6 | Massive calcium carbonate | — | — | 1.28 | 1.9 | 0.98 | 4 | 3 | 4 | 0.28 |
| Comparative Example 7 | Rod-like calcium carbonate | — | 10 or more | 0.88 | 1.6 | 1.22 | 5 | 2 | 2 | 0.47 |

What is claimed is:

1. A biaxially oriented polyester film formed from an aromatic polyester composition containing:
   (A) 100 parts by weight of an aromatic polyester, and
   (B) 0.005 to 5 parts by weight of calcium carbonate particles defined by
       (a) a length/width ratio (2a/2b) in the range of from 1.25 to 3,
       (b) an average particle diameter ($\overline{D}$), as a diameter of a circle converted from an area, in the range of from 0.05 to 5 μm, and
       (c) an ellipse coefficient, represented by the following equation (1), in the range of from 0.7 to 1.2, $$R = \frac{S_1}{S_2} \tag{1}$$

wherein R is an ellipse coefficient, $S_1$ is an observed area of a projected plane of a particle, and $S_2$ is an elliptical area determined on the basis of observed values of the length (2a) and width (2b).

2. The biaxially oriented polyester film of claim 1 wherein the length/width ratio is in the range of from 1.3 to 2.5.

3. The biaxially oriented polyester film of claim 1, wherein the average particle diameter as a diameter of a circle converted from an area is in the range of from 0.1 to 2 μm.

4. The biaxially oriented polyester film of claim 1, wherein the calcium carbonate particles have an ellipse coefficient in the range of from 0.75 to 1.05.

5. The biaxially oriented polyester film of claim 1, wherein the calcium carbonate particles has a relative standard deviation, represented by the following equation, of not more than 0.5, $$\text{Relative standard deviation} = \frac{\sqrt{\sum_{i=1}^{n} (D_1 - \overline{D})^2 / n}}{\overline{D}}$$

in which $D_i$ is a particle diameter, a diameter of a circle converted from an area, of each particle, $\overline{D}$ is an average particle diameter as a diameter of a circle converted from an area, and n is a number (100 pieces) of particles.

6. The biaxially oriented polyester film of claim 5, which contains calcium oriented particles having a relative standard deviation of not more than 0.3.

7. The biaxially oriented polyester film of claim 1, wherein the aromatic polyester is formed from an aromatic dicarboxylic acid as a main carboxylic acid component and an aliphatic diol having 2 to 10 carbon atoms as a main glycol component.

8. The biaxially oriented polyester film of claim 1, wherein the aromatic polyester has, as a main recurring unit, a unit selected from the group consisting of ethylene terephthalate, ethylene-2,6-naphthalate, butylene terephthalate and butylene-2,6-naphthalate.

9. The biaxially oriented polyester film of claim 1, which contains 0.01 to 3 parts by weight of the calcium carbonate particles per 100 parts by weight of the aromatic polyester.

10. A magnetic recording medium formed of the biaxially oriented polyester film recited in claim 1 and a magnetic layer formed thereon.

11. The biaxially oriented polyester film of claim 2 wherein the calcium carbonate particles have an average particle diameter as a diameter of a circle converted from an area is in the range of from 0.1 to 2 μm, an ellipse coefficient in the range of from 0.75 to 1.05 and a relative standard deviation, represented by the following equation, or not more than 0.5, $$\text{Relative standard deviation} = \frac{\sqrt{\sum_{i=1}^{n} (D_1 - \overline{D})^2 / n}}{\overline{D}}$$

in which $D_1$ is a particle diameter, a diameter of a circle converted from an area, of each particle, $\overline{D}$ is an average particle diameter as a diameter of a circle converted from an area, and n is a number (100 pieces) of particles.

12. The biaxially oriented polyester film of claim 11 which contains 0.01 to 3 parts by weight of the calcium carbonate particles per 100 parts by weight of the aromatic polyester.

13. A magnetic recording medium formed of the biaxially oriented polyester film recited in claim 12 and a magnetic layer formed thereon.

* * * * *